(No Model.)  M. P. ALLEN.  2 Sheets—Sheet 1.
MILK RECEPTACLE.
No. 246,441. Patented Aug. 30, 1881.
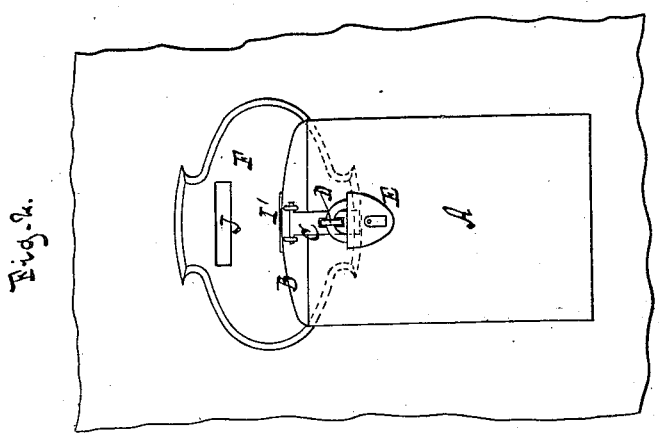
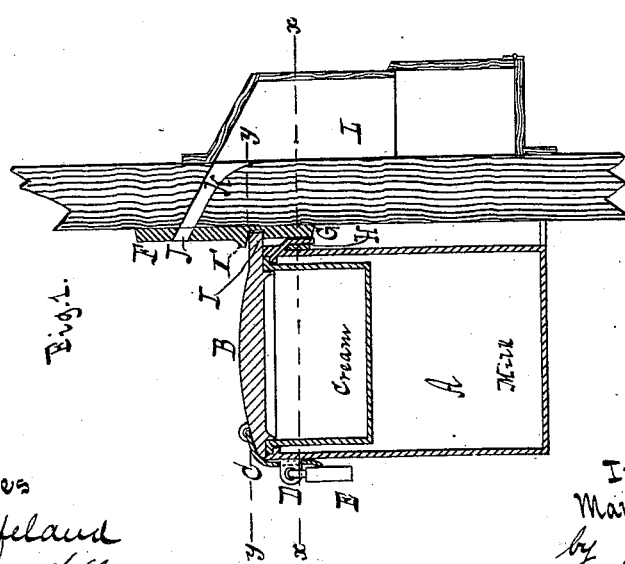
Witnesses
Otto Hufeland
William Miller
Inventor
Maurice P. Allen
by Van Santvoord & Hauff
his attys (No Model.) 2 Sheets—Sheet 2.

M. P. ALLEN.
MILK RECEPTACLE.

No. 246,441. Patented Aug. 30, 1881.

Witnesses.
Chas. Wahlers.
William Miller

Inventor.
M. P. Allen.
by Van Santvoord & Hauff
his Attys.

UNITED STATES PATENT OFFICE.

MAURICE P. ALLEN, OF GREEN POINT, NEW YORK, ASSIGNOR OF ONE-HALF TO THOMAS McHUGH, OF SAME PLACE.

MILK-RECEPTACLE.

SPECIFICATION forming part of Letters Patent No. 246,441, dated August 30, 1881.

Application filed January 20, 1881. (No model.)

*To all whom it may concern:*

Be it known that I, MAURICE P. ALLEN, a citizen of the United States, residing at Green Point, in the county of Kings and State of New York, have invented new and useful Improvements in Milk-Receptacles, of which the following is a specification.

The invention relates to milk-receptacles which are attached to the doors or gates of dwellings; and the object of this invention is to provide milk-receptacles in which the receiving-vessels are detachably connected with their support, and cannot be removed or detached until the cover of the vessel is unlocked from the latter.

Figure 3:
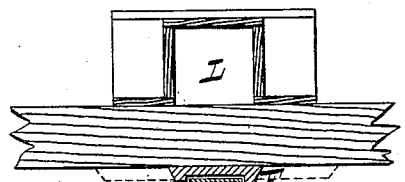
Figure 8:
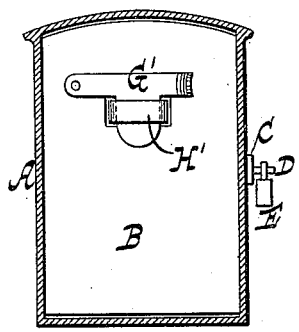
Figure 4:
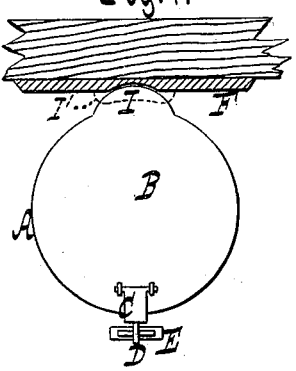
Figure 5:
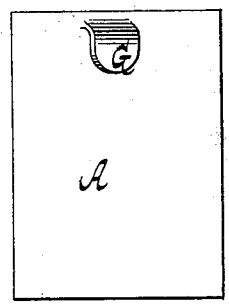
Figure 6:
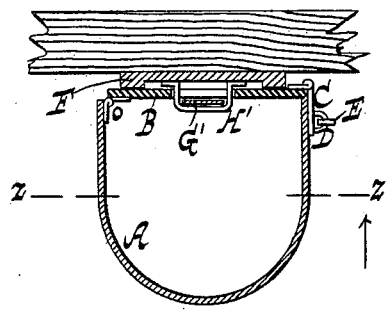
Figure 7:
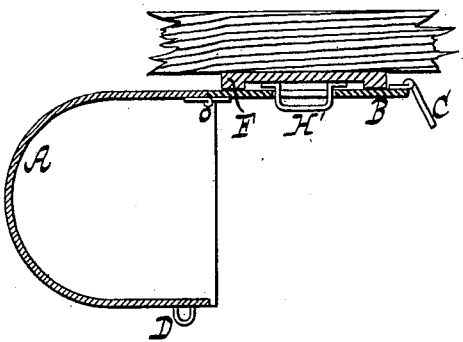

This invention is illustrated in the accompanying drawings, in which Figure 1 represents a vertical cross-section. Fig. 2 is a front view. Fig. 3 is a horizontal sectional view on the line $x\,x$ of Fig. 1. Fig. 4 is a view taken on the line $y\,y$ of Fig. 1. Fig. 5 is a side elevation of the receiving-vessel shown in Figs. 1 and 2. Fig. 6 is a horizontal sectional view, showing modifications of the invention. Fig. 7 is a view similar to Fig. 6, with the receiving-vessel swung open. Fig. 8 is a vertical sectional view on the line $z\,z$ of Fig. 6, looking in the direction of the arrows shown.

Similar letters indicate corresponding parts.

The letter A designates the receiving-vessel, which, in the example shown in Figs. 1 and 2, is open at the top, so that milk or other liquid may be poured directly into it, but which may have its opening in the side, as shown in Figs. 6, 7, and 8, when it is desired to place a pitcher, can, or the like into it.

B designates the cover of the receiving-vessel, which is adapted to be locked to its body by a hasp, C, engaging a staple, D, in which is hung a padlock, E; but it is obvious that other means may be used for this purpose.

F designates the door-plate, to which the receiving-vessel A is hung or fastened to the supporting-plate by a hook, G or G', which engages a socket, H or H', as clearly shown in the drawings.

In the example shown in Figs. 1, 2, 3, and 4 the cover B of the receiving-vessel is left detached, and is provided with a lip, I, opposite to the hasp C, and the door-plate F is provided with a shoulder, I', beneath which this lip catches when the cover is put into place, so that the receiving-vessel is prevented from being lifted to bring the hook G out of its socket except when the cover is unlocked and removed.

In the example shown in Figs. 6, 7, and 8 the cover B of the receiving-vessel is hinged opposite to the hasp C, as at $o$, and the hook G' is pivoted to the inner surface of the cover, the latter having an opening for the passage of the socket H' through it, so that the body of the vessel must be swung away from the cover, as shown in Fig. 7, to get at the hook, which purpose obviously can be accomplished only when the cover is unlocked. If desired, the fastening device can be arranged in the interior of the receiving-vessel, also, when the latter is constructed as shown in Figs. 1 and 2.

The letter J designates the slot in the door-plate; K, the passage in the door or gate opposite to which the slot is made, and L the letter-box, which receives articles introduced into the passage through the slot. The door-plate F is on the outside of the door or gate and the letter-box L on its interior, both being fixtures thereof.

Heretofore a milk-receptacle has been hinged to the frame-work of a door in such manner that when the door is closed the vessel is turned on its pivot and the hinges pass beneath stops, which prevent the vessel being raised to detach it from its pivot-bearings until the door is opened and the vessel turned back to bring its hinges out of line with the stops; but this construction and arrangement does not constitute my invention and is not claimed by me.

What I claim as new, and desire to secure by Letters Patent, is—

1. The combination, with the supporting-plate, the receiving-vessel, and the cover arranged to cover the receiving-vessel, and provided with devices, such as described, for locking it to the receiving-vessel, of a hook and a socket arranged to detachably interlock with each other for supporting the receiving-vessel on the plate, the said cover being constructed and arranged, substantially as shown, to prevent access to the hook until the cover is unlocked and the vessel opened, as set forth.

2. The combination of the supporting plate, the receiving-vessel, and devices for detachably connecting the vessel and plate together, with a cover provided with devices for locking it to the vessel, and constructed, as described, to project over and prevent access to the devices which connect the vessel and supporting-plate together when in a locked position, substantially as set forth.

3. The combination of the supporting-plate, having a socket and a projecting shoulder arranged above the same, with the vessel having a hook adapted to engage the socket, and a cover provided with devices for locking it to the vessel, and having a lip arranged to project beneath the shoulder on the supporting-plate when the cover is in position, substantially as and for the purpose described.

In testimony whereof I have hereunto set my hand and seal in the presence of two subscribing witnesses.

MAURICE P. ALLEN. [L. S.]

Witnesses:
J. HERMANN WAHLERS,
CHAS. WAHLERS.